United States Patent [19]
Yamada et al.

[11] Patent Number: 5,306,368
[45] Date of Patent: Apr. 26, 1994

[54] FORMATION OF CERAMIC THIN FILM ON CERAMIC BODY

[75] Inventors: Hirotake Yamada; Ritsu Tanaka, both of Nagoya, Japan

[73] Assignee: NGK Insulators, Ltd., Japan

[21] Appl. No.: 3,289

[22] Filed: Jan. 12, 1993

[30] Foreign Application Priority Data

Jan. 17, 1992 [JP] Japan .................... 4-006742

[51] Int. Cl.⁵ .............................. B32B 31/00
[52] U.S. Cl. ...................... 156/86; 156/89; 429/31
[58] Field of Search ............... 156/89, 86, 294, 85; 429/30, 31

[56] References Cited

U.S. PATENT DOCUMENTS

| | | | |
|---|---|---|---|
| 4,299,638 | 11/1981 | Matsuhisa | 156/294 |
| 4,769,097 | 9/1988 | Wada | 156/86 |
| 4,913,754 | 4/1990 | Duncan et al. | 156/86 |
| 5,106,550 | 4/1992 | Yogo et al. | 264/60 |

FOREIGN PATENT DOCUMENTS

0166445 1/1986 European Pat. Off. .
0454924 11/1991 European Pat. Off. .

*Primary Examiner*—Jan H. Silbaugh
*Assistant Examiner*—Christopher A. Fiorilla
*Attorney, Agent, or Firm*—Parkhurst, Wendel & Rossi

[57] ABSTRACT

A process for forming a ceramic thin film on a surface of a ceramic body, including the steps of preparing an annular body from a ceramic green sheet, inserting the ceramic body into the annular body, and firing the thus assembled annular body and ceramic body, whereby the annular body is shrunk and joined to the ceramic body.

12 Claims, 2 Drawing Sheets

FIG_1a 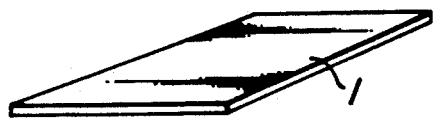
FIG_1b 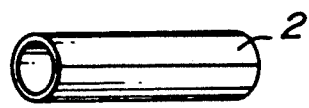
FIG_1c 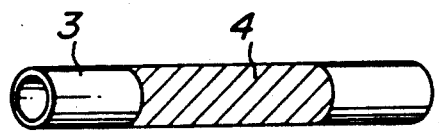
FIG_1d 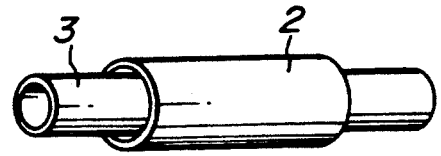
FIG_1e 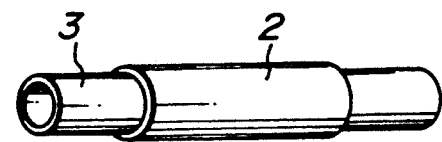

FIG_2a
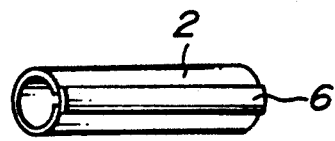
FIG_2b
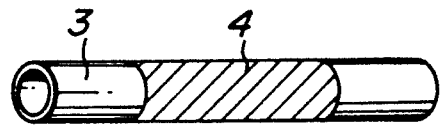
FIG_2c
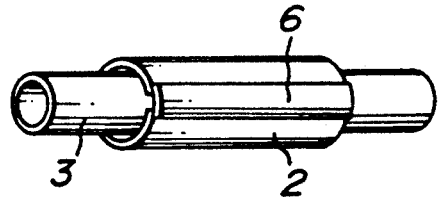
FIG_2d
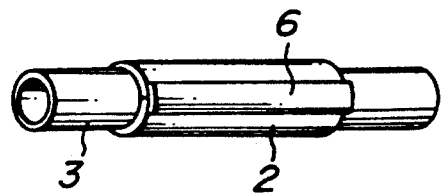
FIG_2e

FORMATION OF CERAMIC THIN FILM ON CERAMIC BODY

BACKGROUND OF THE INVENTION (1) Field of the Invention

The present invention relates to a process for forming a ceramic thin film on a ceramic body. More particularly, the present invention relates to the process for forming a ceramic thin film to be suitably used as a solid electrolyte film, an interconnector film or the like of a cylindrical solid oxide fuel cell.

(2) Related Art Statement

Recently, fuel cells have attracted public attention as power generators. This is because the fuel cell is a device capable of directly converting chemical energy possessed by a fuel to electric energy, and is free from the limitations of the Carnot cycle. Therefore, the fuel cell has an essentially high energy conversion efficiency, causes less pollution, can use a variety of fuels (naphtha, natural gas, methanol, coal-reformed gas, etc.), and the power-generating efficiency is not influenced by the scale of the power-generating plant. Thus, the fuel cell is an extremely promising technique.

In particular, since the solid oxide fuel cells (hereinafter referred to briefly as "SOFC"s) operate at high temperatures around 1,000° C., their electrode reaction is extremely active. Thus, a catalyst of noble metal such as precious platinum is not required at all. Further, since polarization is small, and output voltage is relatively high, energy converting efficiency is far greater as compared with those in other fuel cells. Furthermore, since the SOFC is entirely constituted by solid structural materials, the SOFC has long stability and long use life.

In the above-mentioned SOFC, it is necessary that a solid electrolyte thin film and/or an inter-connector thin film is provided on a cylindrical porous electrode-supporting body. The term "porous electrode-supporting body" may include a porous air electrode itself, a porous fuel electrode itself, and a porous supporting body on which a porous air or fuel electrode is formed. The porous electrode-supporting body may be solid or hollow. Heretofore, thin film-forming processes such as a chemical vapor deposition process (CVD process) and an electrochemical vapor deposition process (EVD process) have been known to form such solid electrolyte thin films. However, these conventional processes have problems in that thin film-forming devices become bulky, and the treatable area and treating speed are too small. For this reason, these processes have defects in that cost is high, and the area of the solid electrolyte film is difficult to increase. In the case of the EVD process, the substrate is limited to the cylindrical shape only.

Since plasma spraying advantageously enables simple formation of thin and relatively dense films at high film-forming speeds the plasma spraying process has been conventionally used for the production of the SOFCs (Sunshine 1981, Vol. 2, No. 1). However, since the plasma-sprayed film has generally a problem that the gas-tightness is poor, if a solid electrolyte film of the above-mentioned SOFC is formed by plasma spraying, the gas-tightness of the film is insufficient. Consequently, a fuel leakage occurs, that is, hydrogen, carbon monoxide or the like leaks through the solid electrolyte film, during the operation of the SOFC. Thus, the electromotive force per cell unit of the SOFC becomes smaller than, for example, IV in ordinary cases, so that output drops and convention rate of the fuel to the electric power decreases.

In addition, a technique is known, which forms an interconnector thin film by using the EVD process. However, as is the same with the formation of the solid electrolyte thin film, the film-forming device becomes bulky, and the treating area and the treating speed are too small, with the result that the cost rises, and the mass productivity becomes difficult.

SUMMARY OF THE INVENTION

It is an object of the present invention to eliminate the above-mentioned problems, and to provide a process capable of easily and inexpensively forming a ceramic thin film having good performance.

The process for producing the ceramic thin film according to the present invention is directed to the formation of a thin ceramic film on a surface of a ceramic body, and is characterized by comprising the steps of preparing an annular body from a ceramic green sheet, inserting the ceramic body into the annular body, and forming the ceramic thin film on the surface of the ceramic body by shrinking and joining the annular body to the ceramic body by firing in this state.

The term "joining" used in the specification and the claims means that since the annular body is shrunk on firing, the fired annular body (thin ceramic film) is formed on the surface of the ceramic body such that the annular body is physically and/or chemically joined to the surface of the ceramic body with no substantial gap at an interface between the annular body, and the ceramic body so that the annular body may not be peeled from the ceramic body. As mentioned later, the term "joining" includes bonding the annular body to the ceramic body by using an adhesive. The term "joining" may include "physical joining" and "both physical joining and chemical joining".

In the above-mentioned construction, the annular body is prepared from the ceramic green sheet, the ceramic body is inserted into the annular body, and the assembled ceramic body and annular body are fired in this state, so that the annular body is shrunk and bonded to the ceramic body. The present invention is based on the discovery that the dense ceramic thin film having good performance can be formed on the surface of the ceramic body by such a simple process.

The annular body means a green ceramic body in the form of a thin annular film, which may have generally the thickness of tens of $\mu$m to hundreds of $\mu$m. Such a green ceramic body may be produced by preparing a green ceramic sheet having a thickness of tens of $\mu$m to hundreds of $\mu$m, cutting a rectangular or square sheet from this green ceramic sheet, rolling the cut green sheet in an annular shape after applying an adhesive (glue) on opposite edges of the green sheet, and press bonding the adhesive-applied opposite ends. Alternatively, no adhesive is applied to the cut green sheet, and the green sheet is merely shaped in an annular shape, and the opposite ends are pressed to each other to join them. For example, the annular body may include a thin film of a solid electrolyte and a thin film of an interconnector. The ceramic body means green or fired ceramic bodies, solid or hollow, which have a certain strength great enough to serve as substrates for thin films.

According to the present invention, it is preferable that the firing shrinkage factor of the annular body is greater than that of the ceramic body. It is further preferable that the firing is effected in the state that an adhesive is interposed between the ceramic body and the annular body.

These and other objects, features and advantages of the invention will be appreciated upon reading of the following description of the invention when taken in conjunction with the attached drawings, with the understanding that some modifications, variations or changes of the invention could be easily made by the skilled person in the art to which the invention pertains, without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1 (a) through (e) are views for illustrating an example of the process for producing the ceramic thin film according to the present invention in the order of producing steps; and FIGS. 2 (a) through (e) are views for illustrating another example of the process for producing the ceramic thin film according to the present invention in the order of producing steps, in which an electrolyte and an interconnector are simultaneously formed.

DETAILED DESCRIPTION OF THE INVENTION

An example of the process for producing a ceramic thin film according to the present invention is illustrated in FIGS. 1 (a) through (e) in the order of the producing steps. In the example of FIGS. 1 (a) through (e), a solid electrolyte thin film only is formed on a porous electrode-supporting body. First, as shown in FIG. 1 (a), a zirconia sheet 1 is formed by a tape-casting process or the like. It is necessary to determine the shape of the zirconia sheet 1 depending upon the diameter and the length of a cylindrical body to be produced. Next, as shown in FIG. 1 (b), an annular body 2 is obtained from the zirconia sheet 1 by joining opposite ends of the zirconia sheet 1 through bonding with adhesive or press bonding. It is necessary that the inner diameter of the annular body 2 is set to be substantially equal to or slightly smaller than the outer diameter of the ceramic body as measured after shrinkage, considering the firing shrinkage factor thereof.

The term "porous electrode-supporting" in the case of the SOFC includes a porous air electrode, a porous fuel electrode, a porous air electrode formed on a porous supporting body and a porous fuel electrode formed on a porous supporting body. The porous electrode-supporting body may be solid or hollow.

Then, as shown in FIG. 1 (c), an adhesive is applied onto the porous electrode-supporting body 3 preliminarily prepared, such that an outer surface 4 of the supporting member upon which the annular body 2 contacts is dipped into a slurry or the slurry is sprayed onto the outer surface 4. At that time, it is preferable that a difference of (a coefficient of thermal expansion of the supporting body 3—a coefficient of thermal expansion of the annular body 2) is in a range of $-2.0\times10^{-6}$ to $+1.0\times10^{-6}$. With respect to both the ceramic body and the annular body, the coefficient of thermal expansion means a coefficient of thermal expansion in a temperature range in which the ceramic body or the annular body can be reversibly and repeatedly expanded and shrunk. Further, it is preferable that the firing shrinkage factor of the annular body 2 is greater than that of the supporting body 3. Further, it is preferable to use, as the adhesive, $Cr_2O_3$, $MnO_2$, $Mn_3O_4$, $LaMnO_3$, $LaCoO_3$, $ZrO_2$ stabilized with $Y_2O_3$, or a mixture thereof, which exhibits electroconductivity at 1,000° C. Next, as shown in FIG. 1 (d), the annular body 2 is fitted around a given location of the porous electrode-supporting body 3 which is coated with the adhesive. Finally, the assembled annular body and supporting body are fired in this state, so that the annular body 2 is shrunk and joined to the porous electrode-supporting body 3. Thereby, the porous electrode-supporting body 3 having the solid electrolyte thin film 2 can be obtained as shown in FIG. 1 (e). As to the ceramic supporting body, the supporting body may be used according to the present invention in either fired or green state.

FIGS. 2 (a) through (e) are views for illustrating another example of the process for producing the ceramic thin film according to the present invention in the order of producing steps. In the example of FIGS. 2 (a) through (e), a solid electrolyte thin film and an interconnector thin film are simultaneously formed on a porous electrode-supporting body. In FIGS. 2 (a) through 2 (e), the same reference numerals are given to the same parts or members as those in FIGS. 1 (a) through (e), and their explanation is omitted. The example of FIGS. 2 (a) through 2 (e) differs from that in FIGS. 1 (a) through (e) in that a sheet 6 for an interconnector made of lanthanum chromite doped with calcium is prepared separately from an zirconia sheet 1, and an annular sheet 2 is formed by arranging the interconnector sheet 6 at an opening defined between opposed ends of the zirconia sheet 1. By following the same steps as in FIGS. 1 (a) through 1 (e) excluding the above difference, the porous electrode-supporting body 3 having the solid electrolyte film 2 and the interconnector thin film 6 can be obtained.

The cylindrical porous electrode-supporting body may generally have a thickness of hundreds of $\mu m$ to few mm and can allow sufficient permeation of a gas. For example, the porous electrode support may be made of lanthanum manganate ($LaMnO_3$) doped with Sr, Ca or the like. The interconnector may be made of lanthanum chromite ($LaCrO_3$) doped with Ca, Mg, Sr or the like. The solid electrolyte may be made of zirconia ($ZrO_2$) stabilized with yttoria (Y) in an amount of 3-16 mol %, generally made of $ZrO_2$ stabilized with 8 mol % yttria (8 mol % YSZ).

In the following, actual examples of the process for producing theced ceramic thin films according to the present invention will be explained.

Experiment 1

A solvent and a binder were added to a powder given in Table 1, which was extruded. Then, an extrudate was fired at 1,200° C. to 1,600° C. and worked, thereby obtaining a solid rod having a diameter of 20 mm and a length of 100 mm. Independently, annular bodies having a diameter of 22 mm, a length of 80 mm, and a thickness of 100 $\mu m$ were prepared from a green sheet composed of partially stabilized zirconia containing 8 mol % $Y_2O_3$ (hereinafter referred to as "8YSZ") or a green sheet composed of $Al_2O_3$. Then, an adhesive was applied onto an outer surface of the solid rod upon which the annular body was to contact. As the adhesive, partially stabilized zirconia powder was used in the case of the 8YSZ annular body, and $Al_2O_3$ powder was used in the case of the $Al_2O_3$ annular body. Thereafter, the annular body was fitted around the solid rod, which were fired at 1,400° C. A joined state and any crack occurring in the thin film were observed. A clearance between the outer diameter of the solid rod and the inner diameter of the annular body was set at 2.0 mm before the firing. Results are shown in Table 1.

TABLE 1

| | | Annular body | | | | |
|---|---|---|---|---|---|---|
| | | 8YSZ (coefficient of thermal expansion, $10.5 \times 10^{-6}$) | | | $Al_2O_3$ (coefficient of thermal expansion, $8.6 \times 10^{-6}$) | |
| Solid rod (coefficient of thermal expansion, $\times 10^{-6}$) | | Difference in coefficient of thermal expansion* | Joined state | Cut | Difference in coefficient of thermal expansion** | Joined state | Cut |
| Mullite | 4.5 | $-6.0 \times 10^{-6}$ | Δ | Δ | $-4.1 \times 10^{-6}$ | Δ | Δ |
| Titania | 8.0 | $-2.5 \times 10^{-6}$ | Δ | Δ | $-0.6 \times 10^{-6}$ | ◯ | ◯ |
| Spinel | 8.2 | $-2.3 \times 10^{-6}$ | ◯ | ◯ | $-0.4 \times 10^{-6}$ | ◯ | ◯ |
| $Al_2O_3$ | 8.6 | $-1.9 \times 10^{-6}$ | ◯ | ◯ | 0 | ◯ | ◯ |
| La(Sr)CrO$_3$ | 8.9 | $-1.6 \times 10^{-6}$ | ◯ | ◯ | $+0.3 \times 10^{-6}$ | ◯ | ◯ |
| Beryllia | 9.1 | $-1.4 \times 10^{-6}$ | ◯ | ◯ | $+0.5 \times 10^{-6}$ | ◯ | ◯ |
| Forstelite | 9.5 | $-1.0 \times 10^{-6}$ | ◯ | ◯ | $+0.9 \times 10^{-6}$ | ◯ | ◯ |
| 8YSZ | 10.5 | 0 | ◯ | ◯ | $+1.9 \times 10^{-6}$ | Δ | ◯ |
| La(Sr)MnO$_3$ | 11 | $+0.5 \times 10^{-6}$ | ◯ | ◯ | $+2.4 \times 10^{-6}$ | Δ | ◯ |
| Calcia | 13.0 | $+2.5 \times 10^{-6}$ | Δ | Δ | $+4.4 \times 10^{-6}$ | Δ | Δ |
| Magnesia | 14.2 | $+3.7 \times 10^{-6}$ | Δ | Δ | $+5.6 \times 10^{-6}$ | Δ | Δ |

Note)
◯: good, Δ: partially good
*Coefficient of thermal expansion of solid rod - coefficient of thermal expansion of 8YSZ
**Coefficient of thermal expansion of solid rod - coefficient of thermal expansion of $Al_2O_3$ It is seen from the results in Table 1 that almost excellent ceramic thin films can be obtained from any ceramic according to the present invention. Further, it is also seen that when a difference in coefficient of thermal expansion between the thin film and the supporting body is in a range from $-2.0 \times 10^{-6}$ to $1.0 \times 10^{-6}$, more excellent results can be obtained. Thus, this difference in thermal expansion is preferred.

Experiment 2

In order to examine the relationship between the outer diameter of the porous electrode-supporting body and the inner diameter of the annular body made of a solid electrolyte, an annular body made of 8 mol % YSZ was fitted around a porous electrode-supporting body through the 8 mol % YSZ adhesive. The porous electrode-supporting body had an outer diameter of 20 mm and a thickness of 2 mm. The annular body was prepared from a solid electrolyte made of 8 mol % YSZ according to the producing processing Experiment 1, and had an inner diameter and a thickness given in Table 2. Then, the assembled annular body and porous electrode-supporting body were fired at a firing temperature of 1,300° C. After the firing, the thickness of the annular body and the state of the interface between the annular body and the supporting body were examined. Results are shown in Table 2.

TABLE 2

| Before firing | | After firing | |
|---|---|---|---|
| Inner diameter of annular body (mm) | Thickness of annular body (μm) | Thickness of annular body (mm) | State of interface |
| 20 | 100 | 65 | good |
| 21 | 100 | 70 | good |
| 22 | 100 | 75 | good |
| 23 | 100 | 80 | good |
| 24 | 100 | 80 | good |
| 25 | 100 | 80 | slight gap present |
| 26 | 100 | 80 | slight gap present |

It is seen from the results in Table 2 that when the inner diameter of the annular body was not more than 23 mm, gas-tightness was kept, and no gap was observed at the interface. On the other hand, it is seen that when the inner diameter of the annular body was 25 mm or more, a gap due to insufficient shrinkage was observed at the interface. From this, it is seen that a desirable range is also present with respect to a clearance. Further, with respect to each of the annular bodies, an insulating reaction product $La_2Zr_2O_7$ was not produced at the interface, and gas leakage did not occur in a leakage-judging test at all.

As is clear from the above explanation, according to the present invention, the dense ceramic thin film having good performance can be formed on the surface of the ceramic body by preparing the annular body from the ceramic green sheet, fitting the annular body around the ceramic body, and firing the assembled annular body and ceramic body. Accordingly, the self-supporting type SOFC having the solid electrolyte thin film and/or the interconnector thin film formed on the porous electrode-supporting body can be simply and inexpensively obtained by the present invention.

What is claimed is:

1. A process for forming a solid oxide fuel cell, comprising the steps of:
    forming an elongate tubular ceramic porous electrode supporting body having a substantially cylindrical outer shape;
    forming a substantially annular green ceramic solid electrolyte thin film from a ceramic solid electrolyte green sheet having a thickness ranging from tens of microns to hundreds of microns;
    fitting said substantially annular solid electrolyte thin film around the outer peripheral surface of said elongate porous electrode supporting body to form an assembly;
    firing the assembly to shrink and join the entirety of said inner surface of said substantially annular solid electrolyte thin film to a corresponding portion of said outer peripheral surface of said elongate porous electrode supporting body; and forming a porous electrode on at least a portion of said solid electrolyte thin film.

2. The porous of claim 1, wherein the fitting step provides an assembly wherein opposite axial ends of said elongate porous electrode supporting body extend outwardly from an inner surface of said substantially annular solid electrolyte thin film.

3. The process of claim 1, wherein a firing shrinkage factor of said substantially annular ceramic solid electrolyte thin film is greater than that of said elongate tubular ceramic porous electrode supporting body.

4. The process of claim 1, wherein a difference between the coefficient of thermal expansion of said elongate tubular ceramic porous electrode supporting body and that of said substantially annular ceramic solid electrolyte thin film is in the range of $-2.0 \times 10^{-6}$ to $+1.0 \times 10^{-6}$.

5. The process of claim 1, further comprising, before the firing step, the step of interposing an adhesive between said solid electrolyte thin film and said elongate tubular ceramic porous electrode supporting body.

6. The process of claim 5, wherein said adhesive is selected from the group consisting of $Cr_2O_3$, $MnO_2$, $MN_3O_4$, $LaMnO_3$, $LaCoO_3$, $ZrO_2$ stabilized with $Y_2O_3$, and mixtures thereof.

7. A process for forming a solid oxide fuel cell, comprising the steps of:

forming an elongate tubular ceramic porous electrode supporting body having a substantially cylindrical outer shape;

forming a substantially annular green ceramic solid electrolyte thin film from a ceramic solid electrolyte green sheet having an axial length shorter than an axial length of said elongate porous electrode supporting body and a thickness ranging from tens of microns to hundreds of microns, said substantially annular solid electrolyte thin film having an opening defined between edges of said green sheet and extending along the entire axial length thereof;

forming an elongate interconnector attached to a portion of said substantially annular solid electrolyte thin film substantially to cover said opening;

fitting said substantially annular solid electrolyte thin film with attached interconnector around the outer peripheral surface of said elongate porous electrode supporting body to form an assembly;

firing the assembly to shrink said substantially annular solid electrolyte thin film and close said opening, and join the entirety of said inner surface to a corresponding portion of said outer peripheral surface of said elongate porous electrode supporting body; and forming a porous electrode on at least a portion of said solid electrolyte thin film.

8. The process of claim 7, wherein the fitting step provides an assembly wherein opposite axial ends of said elongate porous electrode supporting body extend outwardly from an inner surface of said substantially annular solid electrolyte thin film.

9. The process of claim 7, wherein a firing shrinkage factor of said substantially annular ceramic solid electrolyte thin film is greater than that of said elongate tubular ceramic porous electrode supporting body.

10. The process of claim 7, wherein a difference between the coefficient of thermal expansion of said elongate tubular ceramic porous electrode supporting body and that of said substantially annular ceramic solid electrolyte thin film is in the range of $-2.0 \times 10^{-6}$ to $+1.0 \times 10^{-6}$.

11. The process of claim 7, further comprising, before the firing step, the step of interposing an adhesive between said solid electrolyte thin film and said elongate tubular ceramic porous electrode supporting body.

12. The process of claim 11, wherein said adhesive is selected from the group consisting of $Cr_2O_3$, $MnO_2$, $Mn_3O_4$, $LaMnO_3$, $LaCoO_3$, $ZrO_2$ stabilized with $Y_2O_3$, and mixtures thereof.

* * * * *